(12) United States Patent
Cai et al.

(10) Patent No.: US 10,205,671 B2
(45) Date of Patent: Feb. 12, 2019

(54) METHOD AND APPARATUS FOR ADDING TOKEN IN TRAFFIC SHAPING

(71) Applicant: ZTE CORPORATION, Guangdong (CN)

(72) Inventors: Xuequan Cai, Guangdong (CN); Min Zeng, Guangdong (CN); Gang Xia, Guangdong (CN); Kaixin Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 296 days.

(21) Appl. No.: 15/107,771

(22) PCT Filed: May 20, 2014

(86) PCT No.: PCT/CN2014/077926
§ 371 (c)(1),
(2) Date: Jun. 23, 2016

(87) PCT Pub. No.: WO2015/096362
PCT Pub. Date: Jul. 2, 2015

(65) Prior Publication Data
US 2016/0380903 A1 Dec. 29, 2016

(30) Foreign Application Priority Data
Dec. 25, 2013 (CN) .......................... 2013 1 0731611

(51) Int. Cl.
*H04L 12/64* (2006.01)
*H04L 12/28* (2006.01)
(Continued)

(52) U.S. Cl.
CPC ........ *H04L 47/527* (2013.01); *H04L 12/6418* (2013.01); *H04L 47/22* (2013.01); *H04L 47/24* (2013.01); *H04L 47/629* (2013.01)

(58) Field of Classification Search
CPC .......... H04L 47/22; H04L 47/24; H04L 47/52
See application file for complete search history.

(56) References Cited

U.S. PATENT DOCUMENTS

| | | | |
|---|---|---|---|
| 2002/0089952 A1* | 7/2002 | Cao ........................ | H04L 47/10 370/335 |
| 2003/0076848 A1* | 4/2003 | Bremler-Barr ......... | H04L 29/06 370/412 |

(Continued)

FOREIGN PATENT DOCUMENTS

| | | |
|---|---|---|
| CN | 101599905 A | 12/2009 |
| CN | 101834786 A | 9/2010 |

(Continued)

OTHER PUBLICATIONS

Supplementary European Search Report issued in Application No. EP 14 87 3941 dated Mar. 16, 2017.

*Primary Examiner* — Xavier Szewai Wong
(74) *Attorney, Agent, or Firm* — Scully Scott Murphy & Presser (57) ABSTRACT

A method and an apparatus for adding tokens in traffic shaping are provided. According to the method, a weight of each data stream is configured, and each data stream is added to corresponding token schedulers based on the weight of the each data stream. Based on a weight of each token scheduler, each token scheduler is sequentially added to corresponding token scheduler groups, and all the token scheduler groups are aggregated into a token scheduler of a total data stream. The token scheduler of the total data stream is added to a top token scheduler. Based on a preset cycle, a token is assigned to the token scheduler of the total data stream in the top token scheduler, and the assigned token is delivered to each token scheduler group or to a respective data stream.

11 Claims, 6 Drawing Sheets

(51) Int. Cl.
*H04L 12/873* (2013.01)
*H04L 12/815* (2013.01)
*H04L 12/867* (2013.01)
*H04L 12/851* (2013.01)

(56) References Cited

U.S. PATENT DOCUMENTS

| | | | |
|---|---|---|---|
| 2004/0213276 A1* | 10/2004 | Yamada | H04L 12/5602 370/412 |
| 2006/0083226 A1* | 4/2006 | Cahn | H04L 47/245 370/389 |
| 2007/0212071 A1* | 9/2007 | Guo | H04L 47/10 398/69 |
| 2011/0038261 A1 | 2/2011 | Carlström | |
| 2012/0275304 A1 | 11/2012 | Patel et al. | |
| 2013/0039178 A1 | 2/2013 | Chen et al. | |

FOREIGN PATENT DOCUMENTS

| | | |
|---|---|---|
| CN | 102270104 A | 12/2011 |
| CN | 103259743 A | 8/2013 |
| EP | 2 432 170 A1 | 3/2012 |
| WO | WO 2012/159362 A1 | 11/2012 |

\* cited by examiner

METHOD AND APPARATUS FOR ADDING TOKEN IN TRAFFIC SHAPING

CROSS-REFERENCE TO RELATED APPLICATION

This application is the 371 application of PCT Application No. PCT/CN2014/077926, filed May 20, 2014, which is based upon and claims priority to Chinese Patent Application No. 201310731611.9, filed Dec. 25, 2013, the entire contents of which are incorporated herein by reference.

TECHNICAL FIELD

The present disclosure relates to the field of mobile communication, especially to a method and an apparatus for adding a token in traffic shaping.

BACKGROUND

With development of the network, the transmission mode of shared medium becomes the mainstream of the network. The service level of one connection may be defined from three aspects, i.e., an effectiveness of connection, a time delay of connection, and a bandwidth of connection. The three aspects decide the quality of service. The traffic management system plays an important role in the aspect of controlling the time delay and the bandwidth of the connection, thereby affecting the quality of service (QoS) of the connection. One important method for ensuring the quality of service is performing traffic management by the traffic management system. The functions of the traffic management system mainly include: classification, traffic supervision, traffic shaping, scheduling, and statistics. The traffic shaping means forwarding data packets at a preset rate so as to follow a protocol with downstream devices, smooth traffic output, and reduce downstream congestion. During the traffic shaping, adding tokens for a mass of different data streams is a key factor for affecting the effect of the traffic shaping.

At present, a WFQ (Weighted Fair Queuing) method is generally utilized for traffic shaping. This method is particularly performed by: setting one weight corresponding to one maximum rate, converting a shaping rate configured for each data stream into a corresponding weight, and distributing the remained weight to one idle stream so as to occupy the remained bandwidth. However, when using the above WFQ method to add tokens for a mass of data streams having the same relatively small rate, there is a situation in which the tokens are intensively added into the idle stream and no data steam acquires the token during a period of time. In addition, the WFQ method can only allocate the bandwidth proportionally. When a sum of rates for shaping the data steam is greater than the set maximum weight, there is no idle stream. In this case, the data steam can only acquire the tokens according to the weight proportion, and thus the number of tokens which may be acquired by each data steam cannot reach the number deserved by the configured weight.

SUMMARY

Given the above situation, the embodiments of the present disclosure provide a method and an apparatus for adding a token in traffic shaping, which can improve a utilization rate of bandwidth of a system via issuing tokens evenly.

The embodiments of the present disclosure provide a method for adding a token in traffic shaping, including:

configuring a weight of each data steam, and adding respective data stream into a corresponding token scheduler according to the weight of each data stream;

adding respective token scheduler into a corresponding token scheduler group sequentially according to a weight of each token scheduler, and aggregating all the token scheduler groups into a total data stream token scheduler;

adding the total data stream token scheduler into a top token scheduler; and assigning a token to the total data stream token scheduler in the top token scheduler according to a preset period, and issuing the assigned token by the top token scheduler to respective token scheduler groups, or to respective data stream.

The embodiments of the present disclosure also provide an apparatus for adding a token in traffic shaping, including: a configuration module, a bandwidth allocation module, a distribution module, and an information storage module, wherein the configuration module is configured to: configure a weight of each data stream, and add respective data stream into a corresponding token scheduler according to the weight of each data stream; add respective token scheduler into a corresponding token scheduler group sequentially according to a weight of each token scheduler, and aggregate all the token scheduler groups into a total data stream token scheduler; add the total data stream token scheduler into a top token scheduler; and save the weights of respective data stream into the information storage module;

the bandwidth allocation module is configured to assign a token to the total data stream token scheduler in the top token scheduler according to a preset period, and send the assigned token to the distribution module;

the distribution module is configured to issue the token to respective token scheduler groups, or issue the token to respective data stream; and the information storage module is configured to save the weights of respective data stream.

Through the method and apparatus for adding a token in traffic shaping provided by the embodiments of the present disclosure, corresponding shaping rates and shaping weights can be configured for different data streams, and the different data streams are aggregated into a total data stream; during the token distribution, the distribution is firstly carried out in the top token scheduler for fairly scheduling, and thus the tokens are issued evenly. Thereby, through evenly issuing the tokens, the system can shape multiple data streams, so as to improve the utilization rate of the bandwidth.

BRIEF DESCRIPTION OF THE DRAWINGS

FIG. 5-1 illustrates storage content and format of information of the idle stream according to an embodiment of the present disclosure;

FIG. 5-2 illustrates storage content and format of information of the total data stream according to an embodiment of the present disclosure;

FIG. 6-1 illustrates storage content and format of scheduler information in an information storage module according to an embodiment of the present disclosure;

FIG. 6-2 illustrates storage content and format of information of the data stream in the information storage module according to an embodiment of the present disclosure;

DETAILED DESCRIPTION

Hereinafter, further detailed explanations to the present disclosure would be given in combination with the drawings and specific embodiments.

First Embodiment

Figure 1:
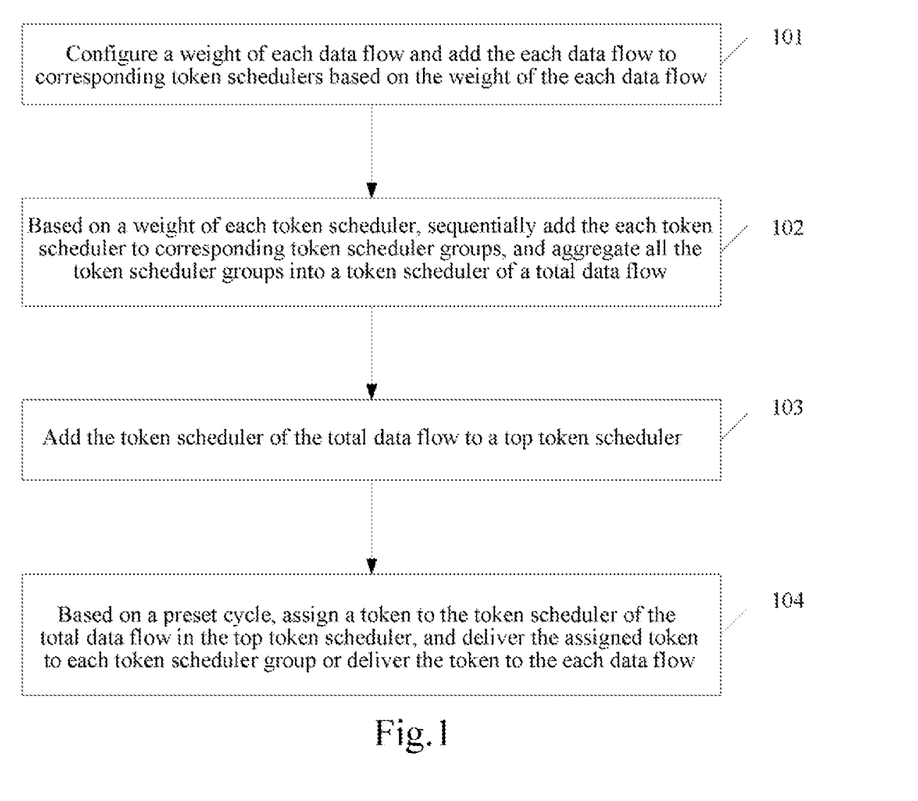
FIG. 1 is a first flowchart of a method for adding a token in traffic shaping according to an embodiment of the present disclosure.

Embodiments of the present disclosure provide a method for adding a token in traffic shaping. As shown in FIG. 1, the method includes the following steps.

In step 101, a weight of each data stream is configured, and each data stream is added into a corresponding token scheduler according to the weight of each data stream.

In step 102, each token scheduler is added into a corresponding token scheduler group in turn according to a weight of each token scheduler, and all the token scheduler groups are aggregated into a total data stream token scheduler.

In step 103, the total data stream token scheduler is added into a top token scheduler.

In step 104, a token is assigned to the total data stream token scheduler in the top token scheduler according to a preset period, and the top token scheduler issues the assigned token to respective token scheduler groups, or issues the token to respective data stream.

The step of configuring the weight of each data stream includes: configuring a shaping rate of each data stream, and converting the shaping rate into the weight corresponding to respective data stream. The converting method belongs to the related art, and is not elaborated herein.

Preferably, before performing step 101, the method further includes: configuring the shaping rate of current idle stream to be a maximum rate, and converting the shaping rate of the idle stream into the weight.

Before performing step 101, the method further includes: presetting the number of layers of the token scheduler group. For example, the token scheduler group may include two layers, i.e., the data stream is directly added into the total data stream token scheduler; or the token scheduler group may be set to have three layers, i.e., a middle layer group is added, and the data stream within a certain weight range is added into this middle layer group.

Before adding respective token schedulers into corresponding token scheduler group according to the weights of respective token schedulers, the weights of respective token schedulers may be calculated. The calculation may include calculating a sum of weights of all the data streams hooked by respective token schedulers, or a sum of weights of all the token schedulers hooked by respective token schedulers.

Preferably, when aggregating all the token scheduler groups into the total data stream token scheduler, the method further includes: calculating a weight of the total data stream and a weight of the idle stream, wherein the calculating the weight of the total data stream is calculating a sum of the weights of all the hooked token scheduler groups or data stream.

Preferably, before issuing the token to respective token scheduler groups or issuing the token to respective data stream by the top token scheduler according to the preset period, the method further includes: adjusting the weight of the total data stream. In particular, the adjusting the weight of the total data stream is performed by: determining whether the weight of the total data stream is greater than or equal to a preset system maximum weight; if yes, increasing the number of the tokens issued within each period by a designated value to obtain the adjusted number of tokens issued within each period, and calculating a weight adjusting coefficient of the total data stream according to the number of the tokens issued within each period, and then multiplying the weight adjusting coefficient by the weight of the original total data stream so as to obtain the adjusted weight of the total data stream.

The step of increasing the number of the tokens issued within each period by the designated value to obtain the adjusted number of the tokens issued within the each period includes: adding the number of the tokens issued within each period by 1, so as to obtain the adjusted number N+1 of the tokens within each period.

The step of calculating the weight adjusting coefficient of the total data stream according to the number of the tokens issued within each period includes: using a ratio between the number N of the tokens issued within each period and the adjusted number N+1 of the tokens issued within each period as the weight adjusting coefficient.

The length of the period may be preset.

The step of adding the total data stream token scheduler into the top token scheduler includes: adding the total data stream token scheduler and an idle stream token scheduler into the top token scheduler according to the weight of the total data stream and the weight of the idle stream.

In particular, the scheduler has N scheduling queues and one cyclical clock according to precision. The data stream which is added into the scheduler for the first time (moment 0) may be added into a corresponding queue according to the weight of this data stream. Each moment at which the scheduler serves corresponds to one scheduling queue. After the service to all the streams (when there are many layers, the scheduler group may be deemed as a stream from an upper layer of view) in the scheduling queue at the current service moment are completed, the scheduler may calculate a next service moment according to the current service moment and the scheduling queue in which the stream exists in the system, and after jumping to the next service moment, the scheduling queue corresponding to the next moment starts to be served. Every time the stream in the scheduling queue is served, the stream in the scheduling queue may calculate a next timing at which the stream would be served according to the weight itself and the current service moment, and the stream is hooked to a corresponding scheduling queue.

The step of issuing the tokens to respective data stream may be as follows: the number of the tokens obtained by respective data stream is determined by the weight of the data stream. The system serves the corresponding scheduling queue according to the scheduling moment, and respective data stream is added into the corresponding scheduling queue according to the weights thereof. The probability of serving the data stream having a high weight is high. According to the WFQ scheduling algorithm, during one round of scheduling, the proportion of obtaining the tokens by respective data stream is equal to their weight proportion. The WFQ scheduling algorithm belongs to the prior art, and is not elaborated herein.

The step of issuing the tokens to respective token scheduling group, or issuing the tokens to respective data stream by the top token scheduler according to the preset period includes: the top token scheduler determines whether the token is issued to the idle stream or to the total data stream in the current period according to a service period pointer; and if the token is issued to the idle stream, the top token scheduler calculates a next service period pointer of the idle stream according to the weight of the idle stream;

and if the token is issued to the total data stream, the top token scheduler calculates a next service period pointer corresponding to the total data stream according to the weight of the total data stream, sends the token to a lower scheduler of the total data stream, uses the lower scheduler as the current layer scheduler, and determines whether the current layer scheduler is hooked to the data stream; if yes, then adds corresponding number of tokens into a token bucket of the data stream, and calculates a next service period pointer according to the weight of the data stream, and thereby the present distribution of the tokens is completed; otherwise, calculates the next service period pointer according to the current layer token scheduler.

Preferably, after the top token scheduler issues the tokens to respective token scheduler group, or issues the tokens to respective data stream according to the preset period, the method further includes: after any of data stream obtains the tokens, the number of shaping bytes corresponding to the data stream is determined according to the number of shaping bytes corresponding to the tokens. In particular, the traffic shaping system cooperates with an external system, and may calculate a total bandwidth of the system according to a clock period and the number of bytes of each issuing. Thus, at the beginning of the design, the system determines the total bandwidth and the clock period of each issuing, thereby the corresponding relationship between the number of tokens and the number of shaping bytes of each issuing is decided.

Before assigning the tokens to the total data stream token scheduler in the top token scheduler based on the preset period, the method further includes: generating a token based on the preset period.

Through the embodiments of the present disclosure, the manner of WFQ scheduling is hierarchical, thereby corresponding shaping rates and shaping weights are configured for different data streams and then the data streams are aggregated into a total data stream; when distributing the tokens, the bandwidth of the top layer is extended according to requirements first, so as to fairly schedule the summation of the data stream and the idle stream, in this way, the tokens are issued evenly; also, it is selectable to average again the tokens of data stream of respective group bandwidth in the middle layer WFQ, so as to achieve the shaping to the multiple data streams, and obtain a good effect.

Figure 2:
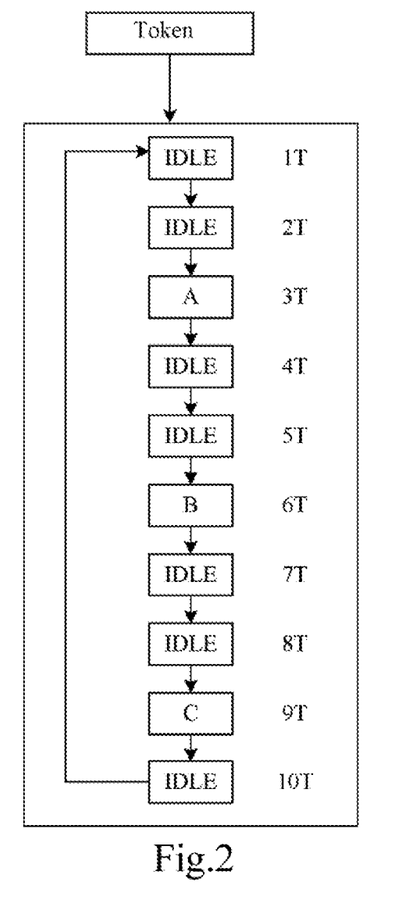
FIG. 2 illustrates an example of a procedure of distributing a token according to an embodiment of the present disclosure.

When adopting the embodiments of the present disclosure, the procedure of distributing the tokens may be as shown in FIG. 2.

At 1T moment, the tokens are distributed to the idle stream IDLE.

At 2T moment, the tokens are distributed to the idle stream IDLE.

At 3T moment, the tokens are distributed to the data stream A.

At 4T moment, the tokens are distributed to the idle stream IDLE.

At 5T moment, the tokens are distributed to the idle stream IDLE.

At 6T moment, the tokens are distributed to the data stream B.

At 7T moment, the tokens are distributed to the idle stream IDLE.

At 8T moment, the tokens are distributed to the idle stream IDLE.

At 9T moment, the tokens are distributed to the data stream C.

At 10T moment, the tokens are distributed to the idle stream IDLE.

Similarly, using 10T as one period, and according to the above-mentioned steps, the distribution of the tokens is repeated, in this way, the data stream A obtains one-tenth tokens, the shaping tokens obtained by the data stream A is 1 Gbps, the shaping tokens obtained by the data stream B and the data stream C are also 1 Gbps, and the idle stream consumes 7 Gbps shaping tokens. When the present disclosure is not adopted, the moments of acquiring the tokens by the data stream and by the idle stream are relatively concentrated; and when adopting the present disclosure, the moments of acquiring the tokens by the data stream and by the idle stream are relatively even.

The period interval T of generating tokens may be adjusted according to the bandwidth and the clock frequency of the traffic management system. In the case of the same bandwidth and clock frequency of the traffic management system, and different intervals T, each of the shaping tokens may represent different numbers of bytes of tokens.

After extending the bandwidth of the top layer, the processing capability of the traffic management system may be broken through, and the token whose number is coincided with the configured bandwidth is distributed for respective data stream, thereby improving the bandwidth utilization of the system.

Second Embodiment

Figure 3:
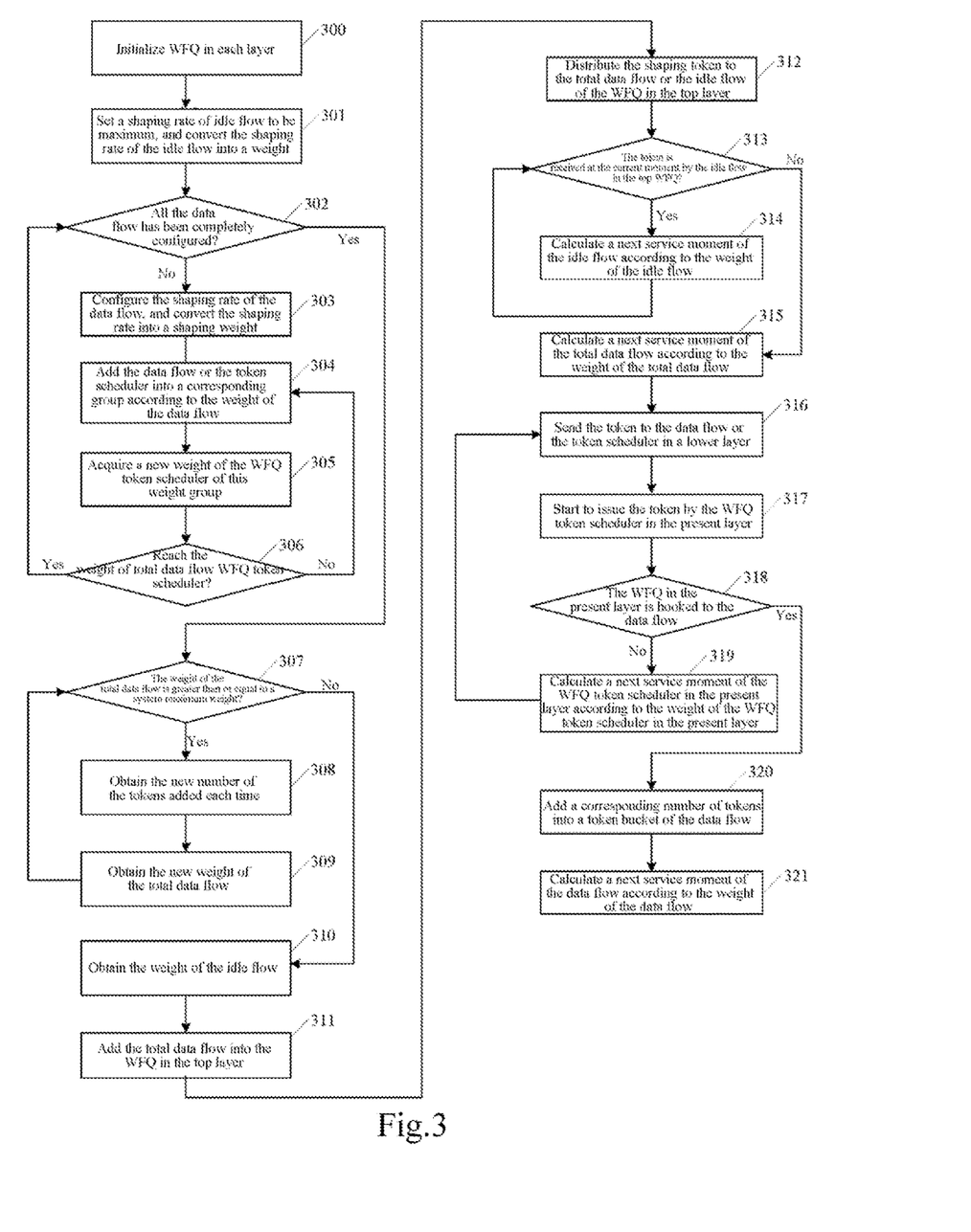
FIG. 3 is a second flowchart of a method for adding a token in traffic shaping according to an embodiment of the present disclosure.

FIG. 3 is a flowchart of a method for distributing a shaping token to respective data stream according to the present disclosure. The main implementing procedure is as follows.

In step 300, WFQ in each layer is initialized, and weights of respective WFQ and total data stream are set to be 0.

In step 301, a shaping rate of idle stream is configured to be maximum, and the shaping rate of the idle stream is converted into the weight, and then the idle stream is added into a top token scheduler.

In step 302, it is determined whether all the current data stream has been completely configured; if yes, step 307 is performed; otherwise, step 303 is performed.

In step 303, any data stream is selected from the data stream without configuration of the shaping rate as the current data stream, the shaping rate of the current data stream is configured, and the shaping rate of the current data stream is converted into the weight of the current data stream.

In step 304, the current data stream is added into a corresponding WFQ token scheduler group according to the weight of the current data stream; or the WFQ token scheduler is added into a corresponding token scheduler group according to the weight of the WFQ token scheduler.

In step 305, the weight of the WFQ token scheduler group and the weight of the current data stream are added to obtain an updated weight of the WFQ token scheduler group.

In step 306, it is determined whether the WFQ token scheduler group is the total data stream; if yes, the process proceeds to step 302; otherwise, step 304 is performed.

In step 307, it is determined whether the weight of the current total data stream is greater than or equal to a preset system maximum weight; if yes, step 308 is performed; otherwise, step 310 is performed.

In step 308, the number N of the tokens issued in every period is added by 1, so that the adjusted number of the tokens issued in every period is N+1.

In step 309, the weight of the total data stream is adjusted to N/N+1 times of the current weight, so as to obtain the adjusted weight of the total data stream, and then the process proceeds to step 307.

In step 310, the weight of the current total data stream is subtracted from the system maximum weight, so as to obtain the updated weight of the idle stream.

In step 311, the total data stream WFQ token scheduler is added into the top token scheduler.

In step 312, a bandwidth allocation module is enabled, so as to distribute the tokens to the total data stream or the idle stream in the top token scheduler.

In step 313, the process waits until a moment for issuing tokens is arrived, then the top token scheduler determines whether the tokens received at the current moment are the tokens of idle stream or the tokens of total data stream; if the received tokens are the tokens of idle stream, then step 314 would be performed; and if the received tokens are the tokens of total data stream, then step 315 would be performed.

Herein, the tokens are obtained by the top token scheduler based on the WFQ scheduling algorithm. For example, the scheduler may select a first stream in the scheduling queue to be served according to the current scheduling moment. There are only two streams, i.e., the total data stream and the idle stream, in the top scheduling. It is possible that one queue is served each time in the same scheduling queue at a certain moment, and then the queue which has been served may be transferred to be added into other scheduling queue.

In step 314, a next service moment is calculated according to the weight of the idle stream, and the idle stream is transferred to the corresponding scheduling queue, then the process goes to step 313.

The calculation may be based on the WFQ scheduling algorithm. For example, after a certain data stream has been served, the next service moment of the data stream may be calculated according to the current moment corresponding to the scheduler where the data stream is located and the weight of the data stream, and then the stream is added into the scheduling queue corresponding to this moment.

In step 315, a next service moment is calculated according to the weight of the total data stream.

In step 316, the tokens are issued to the data stream or the scheduler in the lower layer.

For example, when the lower layer is the data stream, the token value of the current system is directly added for the data stream.

When the lower layer is the scheduler, it is required for the scheduler to issue the tokens according to the WFQ scheduling algorithm, and finally add the tokens into the data stream being served in the lowest layer. During each period of scheduling the data stream from the top layer to the lowest layer, only one data stream would obtain the tokens at last.

In step 317, it is determined whether the current layer (the lower layer in step 316) is a scheduler, if yes, the token is started to be issued to the scheduler in the current layer.

In step 318, it is determined whether the token scheduler of the current layer is hooked to the data stream; if yes, step 320 would be performed; otherwise, step 319 would be performed.

In step 319, a next service moment is calculated according to the weight of the token scheduler, and the process goes to step 316.

In step 320, a corresponding number of tokens are added into a token bucket of the data stream.

In step 321, a next service moment of the data stream is calculated according to the weight of the data stream, and the current token issuing is completed.

Third Embodiment

Figure 4:
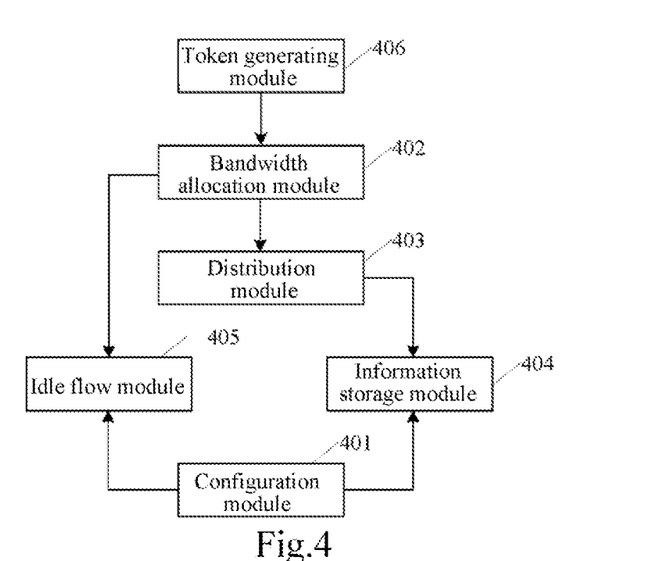
FIG. 4 is a schematic diagram of structural composition of the apparatus for adding a token in traffic shaping according to an embodiment of the present disclosure.

Corresponding to the method described in the Second Embodiment, the embodiments of the present disclosure further propose an apparatus for implementing traffic shaping. As shown in FIG. 4, the apparatus includes: a configuration module 401, a bandwidth allocation module 402, a distribution module 403, and an information storage module 404.

The configuration module 401 is configured to: configure a weight of each data stream, and add each data stream into a corresponding token scheduler according to the weight of each data stream; add each token scheduler into a corresponding token scheduler group in turn according to a weight of each token scheduler, and aggregate all the token scheduler groups into a total data stream token scheduler; add the total data stream token scheduler into a top token scheduler; and save the weights of respective data stream into the information storage module 404.

The bandwidth allocation module 402 is configured to assign a token to the total data stream token scheduler in the top token scheduler according to a preset period, and send the assigned token to the distribution module 403.

The distribution module 403 is configured to issue the token to respective token scheduler groups, or issue the token to respective data stream.

The information storage module 404 is configured to save the weights of respective data stream.

The configuration module 401 is configured to configure a shaping rate of each data stream, and convert the shaping rate into the weight corresponding to each data stream.

The apparatus further includes: an idle stream module 405 configured to configure a shaping rate of the current idle stream to be a maximum rate, and convert the shaping rate of the idle stream into a weight.

The configuration module 401 is configured to determine whether the weight of the total data stream is greater than or equal to a preset system maximum weight; if yes, the number of the tokens issued within each period is increased by a designated value to obtain the adjusted number of tokens issued within each period, and a weight adjusting coefficient of the total data stream is calculated according to the number of the tokens issued within each period, and then the weight adjusting coefficient is multiplied by the weight of the original total data stream so as to obtain the adjusted weight of the total data stream; otherwise, no adjustment is made.

The configuration module is configured to add the number N of the tokens issued in each period by 1, so as to obtain the adjusted number N+1 of the tokens within each period; and use a ratio between the number N of the tokens issued within each period and the adjusted number N+1 of the tokens issued within each period as the weight adjusting coefficient; wherein N is the number of tokens issued by the system each time.

The bandwidth allocation module 402 is configured to determine whether the token is issued to the idle stream or to the total data stream in the current period according to a service period pointer; and if the token is issued to the idle stream, calculate a next service period pointer of the idle stream according to the weight of the idle stream; and if the token is issued to the total data stream, calculate a next service period pointer corresponding to the total data stream according to the weight of the total data stream, and send the token to the distribution module 403. Accordingly, the distribution module 403 is configured to use a lower scheduler of the total data stream as the current layer scheduler, determine whether the current layer scheduler is hooked to the data stream; if yes, then add corresponding tokens into a token bucket of the data stream, and calculate a next service period pointer according to the weight of the data stream, and thus the present distribution of the tokens is completed; otherwise, the next service period pointer is calculated according to the current layer token scheduler.

The apparatus further includes: a token generating module 406 configured to generate a token based on the preset period, and send the token to the bandwidth allocation module 402. Correspondingly, the bandwidth allocation module 402 is configured to receive the token sent from the token generating module 406.

The configuration module 401 is configured to configure a shaping rate for each data stream and convert the shaping rate into a shaping weight, store the shaping weight into the information storage module 404, and add respective data stream into the token distribution module 403 according to the shaping weight of the data stream.

The idle stream module 405 is configured to, when receiving the shaping weight of the data stream configured by the configuration module 401, add the weight of the current total data stream by the shaping weight of new data stream to obtain a new total data stream weight; and when the total data stream weight is greater than a maximum weight, perform a proportional adjustment to obtain a new total data stream weight, subtract the maximum weight of system by the shaping weight of the total data stream to obtain a new idle stream shaping weight, and add the new idle stream shaping weight into the bandwidth allocation module 402 according to the shaping weights of the idle stream and the total data stream.

The bandwidth allocation module 402 is configured to distribute the token for the idle stream or distribute the token for the token distribution module 403 according to the weight of the total data stream or the idle stream.

The token distribution module 403 is configured to pass the tokens on according to the set weight of the token scheduler or the data stream, and finally distribute the token for each data stream.

The information storage module 404 is configured to store the weights of the total data stream and the idle stream, the number N of the tokens issued every time, weight information and linked list information of each data stream and middle layer WFQ, and the number of the tokens received by respective data stream.

The apparatus further includes the token generating module 406, which is configured to periodically generate tokens in a preset interval according to a processing capability of a traffic management system, and transfer the tokens to the bandwidth allocation module 402.

The idle stream module 405 is configured to, after the system is powered on, configure the shaping weight of the total data stream to be 0, and configure the shaping weight of the idle stream to be a maximum value.

The configuration module 401 is configured to convert the shaping rate of the newly added data stream into a shaping weight, store the weights of respective data stream into the information storage module 404, calculate a service moment of the newly added data stream according to the weight of the newly added data stream, then add the newly added data stream into the distribution module 403, and at the same time, notify the shaping weight of the newly added data stream to the idle stream module 405.

The idle stream module 405 is configured to, after the system is powered on, configure the shaping weight of the total data stream to be the maximum value, and configure the shaping weight of the idle stream to be 0; when receiving the shaping weight of the data stream configured by the configuration module 401, add the shaping weight of the current total data stream into the shaping weight of the data stream to obtain a new shaping weight of total data stream, and when the maximum weight is exceeded, proportionally adjust the weight to obtain a new shaping weight of the total data stream, subtract the system maximum weight by the shaping weight of the current total data stream to obtain a new shaping weight of the idle stream, and at the same time, the idle stream module 405 is also stored with the number of tokens issued each time, next pointer information in the WFQ scheduling linked lists of the total data stream and the idle stream.

The token generating module 406 is configured to periodically generate tokens in a preset interval according to a processing capability of a traffic management system, and transfer the tokens to the bandwidth allocation module 402 to implement further distribution of the tokens.

The bandwidth allocation module 402 is configured to issue the tokens to the idle stream or issues the tokens to the distribution module 403 according to the weight of the total data stream or the idle stream, and the module manages the total data stream and the idle stream in a linked list manner.

The distribution module 403 is configured to transfer the tokens layer by layer so as to distribute the tokens to each data stream according to the configured token scheduler at each layer and the weight of each data stream, and the module manages the respective token schedulers and the data stream in a linked list manner.

The information storage module 404 is configured to store the weight information and the linked list information of respective token schedulers and data stream such that the distribution module 403 is able to serve respective schedulers or the data stream one by one according to the linked list and jump according to the weight. Meanwhile, the information storage module 404 is configured to store the number of the tokens received by respective data stream.

During distribution of the tokens, respective schedulers and data stream are connected with each other via the linked list.

The configuration module 401, the bandwidth allocation module 402, the distribution module 403, the idle stream module 405, and the token generating module 406 may be implemented via hardware, such as a DSP or a CPU. The information storage module 404 may be a memory, such as a ROM or a RAM.

Figure 51:
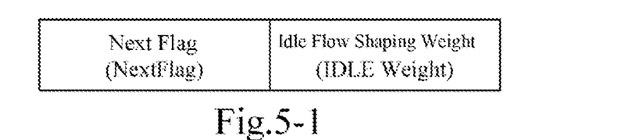

FIG. 5-1 illustrates information storage content and format of idle stream in the idle stream module 405. The information of the idle stream includes a next flag (Next-Flag). When the next flag is 1, it is indicated that the total data stream would receive the token immediately after the idle stream. When the next flag is 0, it is indicated that an idle stream is immediately after the idle stream. The information of the idle stream further includes an idle stream shaping weight (IDLE Weight). The idle stream shaping weight is used for the bandwidth allocation module 402 to calculate the moment at which the idle stream is served next time.

Figure 52:
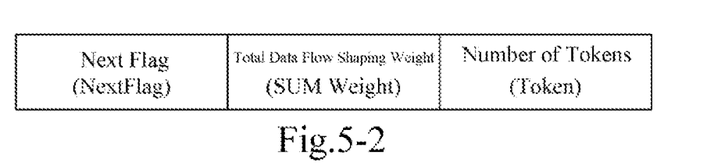

FIG. 5-2 illustrates information storage content and format of the total data stream in the idle stream module 405. The information of the total data stream includes a next flag (NextFlag). When the next flag is 1, it is indicated that the total data stream would receive the token immediately after the total data stream. When the next flag is 0, it is indicated that an idle stream is immediately after the total data stream. The information of the total data stream further includes a total data stream shaping weight (SUM Weight). The total data stream shaping weight is used for the bandwidth allocation module 402 to calculate the moment at which the total data stream is served next time. The information of the total data stream further includes the number of tokens (Token), and the number of the tokens is used as the number of tokens added into the data stream each time by the token distribution module 403.

Figure 61:
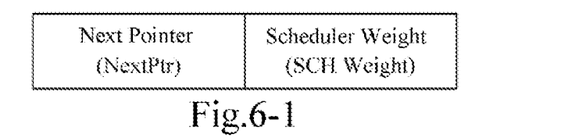

FIG. 6-1 illustrates storage content and format of the token scheduler in a middle layer in the information storage module 404405. The information of the scheduler includes a next pointer (NextPtr), which parameter is used for storing a serial number of the scheduler for indicating a number of scheduler which would receive the token immediately after this scheduler flow in the token distribution module 403. The scheduler information further includes a scheduler weight (SCH Weight), which parameter is used for calculating the moment at which the scheduler is served next time in the token distribution module 403.

Figure 62:
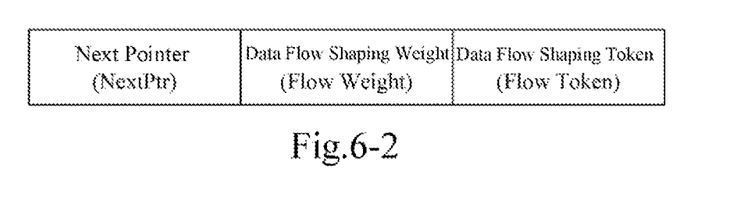

FIG. 6-2 illustrates storage content and format of information of the data stream in the information storage module 404405. The information of the data stream includes a next pointer (NextPtr), which parameter is used for storing a serial number of the data stream for indicating a number of data stream which would receive the token immediately after this data stream during the token distribution of the data stream. The data stream information further includes a data stream shaping weight (Flow Weight), which parameter is used for calculating the moment at which the data stream is served next time in the token distribution module 403. The data stream information further includes a data stream shaping token (Flow Token) for storing the number of the tokens received by this data stream.

Fourth Embodiment

Figure 7:
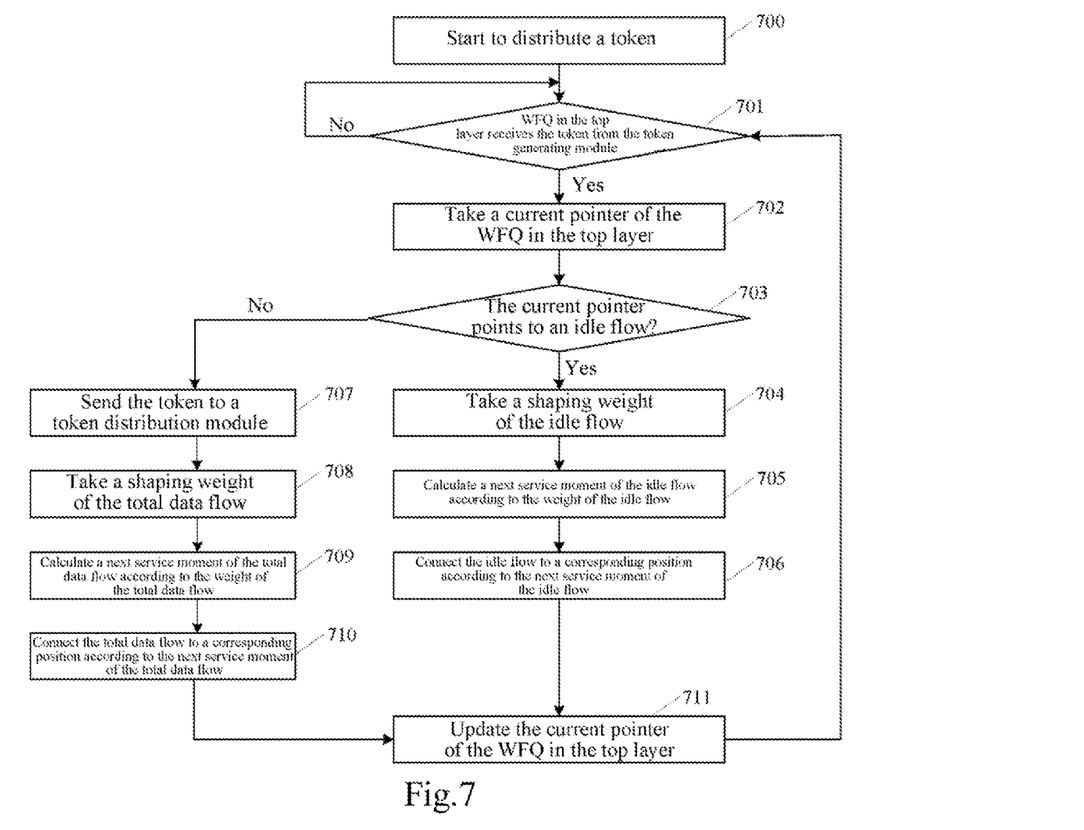
FIG. 7 is a flowchart of distributing bandwidths by a bandwidth allocating module in the present disclosure.

FIG. 7 is a flowchart of distributing tokens by a bandwidth allocating module in the embodiments of the present disclosure. The flow includes the following steps.

In step 700, a token generating module is enabled to assign a token according to a preset interval.

In step 701, it is determined whether a top token scheduler receives the token; if yes, step 702 would be performed; otherwise, the process continues waiting.

In step 702, a current pointer of the top token scheduler is acquired.

In step 703, it is determined whether the current pointer points to an idle stream; if yes, step 704 would be performed; otherwise, step 707 would be performed.

In step 704, a weight of the idle stream is taken.

In step 705, a next service moment of the idle stream is calculated according to the weight of the idle stream.

In step 706, the idle stream is connected, according to the next service moment of the idle stream, to a scheduling queue corresponding to the next service moment, and step 711 is performed.

In step 707, the token is sent to a token distribution module 403.

In step 708, a weight of the total data stream is acquired.

In step 709, a next service moment of the total data stream is calculated according to the weight of the total data stream.

In step 710, the total data stream is connected to a corresponding position according to the next service moment of the total data stream, and step 711 is performed.

In step 711, the current pointer of the top token scheduler is updated, and the process goes to step 701.

Fifth Embodiment

Figure 8:
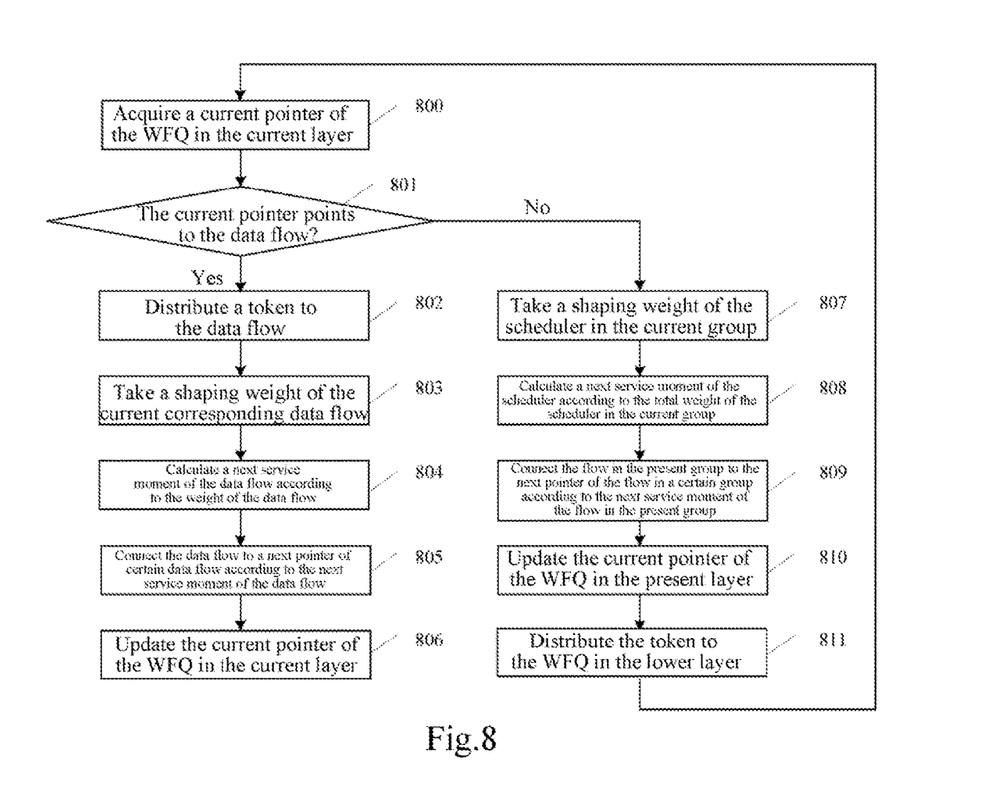
FIG. 8 is a flowchart of distributing tokens by a token distributing module in the present disclosure.

FIG. 8 is a flowchart of distributing tokens by a token distributing module in the embodiments of the present disclosure. The flow includes the following steps.

In step 800, a current pointer of the current layer WFQ is acquired.

In step 801, it is determined whether the current pointer points to a data stream; if yes, step 802 would be performed; otherwise, step 807 would be performed.

The data stream mentioned herein is a concept corresponding to the scheduler. In the case of data stream, the data stream directly obtains the token; and in the case of scheduler, the token needs to be distributed further, until the underlying data stream acquires the token.

The process described herein is equal to a procedure of one recursive operation, thereby the middle layer WFQ scheduler groups should be not too much, otherwise, the efficiency of system shall be affected. In a simplest implementation, there may be no middle layer WFQ, i.e., the data stream is immediately after the total data stream.

In step 802, a token is assigned to the data stream pointed by the current pointer.

In step 803, a weight of the current corresponding data stream is taken.

In step 804, a next service moment of the data stream is calculated according to the weight of the data stream.

In step 805, the data stream is connected to a next pointer of certain data stream according to the next service moment of the data stream.

The next pointer of certain data stream is a next pointer of a last data stream in the scheduling queue corresponding to the next service moment of the data stream. For example, in FIG. 6-2, data stored in each data stream contains one next pointer, after the scheduling queue serves one data stream, the current pointer of the scheduling queue may point to a next pointer of the data stream, then a next service moment of the data stream is calculated according to the current scheduling moment and the weight of the data stream, and the data stream transfers to the corresponding scheduling queue.

In step 806, the current pointer of the current layer WFQ is updated.

In step 807, a weight of the scheduler in the current group is acquired.

In step 808, a next service moment of the scheduler is calculated according to the weight of the scheduler in the current group.

The calculating method is consistent with the above-mentioned method for calculating the data stream. The next service moment of the scheduler is calculated according to the weight of the scheduler and a current service moment of an upper layer scheduler where the scheduler locates, and the scheduler is transferred to a corresponding scheduling queue, and is linked to a next pointer of a last scheduler in the scheduling queue.

In step 809, the scheduler is linked to the next pointer of a certain scheduler according to the next service moment of the scheduler.

In step 810, the current pointer of the present layer WFQ is updated.

In step 811, the token is continued to be distributed to a lower layer WFQ, and the process goes to step 800.

The above-mentioned contents are only the preferred embodiments of the present disclosure, and do not intend to limit the protection scope of the present disclosure.

What is claimed is:

1. A method for adding a token in traffic shaping, comprising:

configuring a weight of each data stream, and adding respective data stream into a corresponding token scheduler according to the weight of each data stream;

adding respective token scheduler into a corresponding token scheduler group sequentially according to a weight of each token scheduler, and aggregating all the token scheduler groups into a total data stream token scheduler;

adding the total data stream token scheduler into a top token scheduler; and assigning tokens to the total data stream token scheduler in the top token scheduler according to a preset period, and issuing the assigned tokens by the top token scheduler to respective token scheduler groups, or to respective data streams, wherein before the assigning the tokens to the total data stream token scheduler in the top token scheduler according to the preset period, and issuing the assigned tokens by the top token scheduler to respective token scheduler groups, or to respective data stream, the method further comprises:

determining whether the weight of the total data stream is greater than or equal to a preset system maximum weight;

when the result of the determination is yes, increasing a number of the tokens issued within each period by a designated value to obtain an adjusted number of tokens issued within each period, calculating a weight adjusting coefficient of the total data stream according to the number of the tokens issued within each period, and multiplying the weight adjusting coefficient by an original weight of the total data stream so as to obtain an adjusted weight of the total data stream, and wherein the assigning the tokens to the total data stream token scheduler in the top token scheduler according to the preset period, and issuing the assigned tokens by the top token scheduler to respective token scheduler groups, or to respective data stream comprises:

determining whether the tokens are issued to the idle stream or to the total data stream in a current period according to a service period pointer of the top token scheduler;

when it is determined that the tokens are issued to the idle stream, calculating a next service period pointer of the idle stream according to the weight of the idle stream; and when it is determined that the tokens are issued to the total data stream, calculating a next service period pointer corresponding to the total data stream according to the weight of the total data stream, sending the tokens to a lower scheduler of the total data stream, using the lower scheduler as the current layer scheduler, and determining whether the current layer scheduler is hooked to the data stream;

when the result of the determination is yes, adding a corresponding number of tokens into a token bucket of the data stream, and calculating a next service period pointer of the data stream according to the weight of the data stream, and terminating the present distribution of the tokens; when the result of the determination is no, calculating the next service period pointer of the current layer token scheduler according to the current layer token scheduler.

2. The method of claim 1, wherein the configuring the weight of each data stream comprises:

configuring a shaping rate of each data stream, and converting the shaping rate into the weight corresponding to respective data stream.

3. The method of claim 1, wherein before the configuring the weight of each data stream, the method comprises:

configuring the shaping rate of a current idle stream to be a maximum rate of the current idle stream, and converting the shaping rate of the current idle stream into the weight of the each data stream.

4. The method of claim 1, wherein the increasing the number of the tokens issued within each period by the designated value to obtain the adjusted number of tokens issued within each period comprises:

adding the number of the tokens issued within each period by 1, so as to obtain the adjusted number of the tokens within each period; and wherein the calculating the weight adjusting coefficient of the total data stream according to the number of the tokens issued within each period comprises: using a ratio between the number of the tokens issued within each period and the adjusted number of the tokens issued within each period as the weight adjusting coefficient.

5. The method of claim 1, wherein before the assigning the tokens to the total data stream token scheduler in the top token scheduler according to the preset period, the method further comprises: generating a plurality of tokens.

6. An apparatus for adding a token in traffic shaping, comprising: a configuration module, a bandwidth allocation module, a distribution module, and an information storage module, wherein the configuration module is configured to:

configure a weight of each data stream, and add respective data stream into a corresponding token scheduler according to the weight of each data stream;

add respective token scheduler into a corresponding token scheduler group sequentially according to a weight of each token scheduler, and aggregate all the token scheduler groups into a total data stream token scheduler;

add the total data stream token scheduler into a top token scheduler; and save the weights of respective data streams into the information storage module;

the bandwidth allocation module is configured to:

assign tokens to the total data stream token scheduler in the top token scheduler according to a preset period, and send the assigned tokens to the distribution module;

the distribution module is configured to issue the tokens to respective token scheduler groups or to respective data streams; and the information storage module is configured to save the weights of respective data stream, wherein the configuration module is further configured to:

determine whether the weight of the total data stream is greater than or equal to a preset system maximum weight; and when the result of the determination is yes, increase the number of the tokens issued within each period by a designated value to obtain the adjusted number of tokens issued within each period, calculate a weight adjusting coefficient of the total data stream according to the number of the tokens issued within each period, and multiply the weight adjusting coefficient by the weight of the original total data stream so as to obtain the adjusted weight of the total data stream, wherein the bandwidth allocation module is further configured to:

determine whether the token is issued to the idle stream or to the total data stream in the current period according to a service period pointer of the top token scheduler;

when it is determined that the token is issued to the idle stream, calculate a next service period pointer of the idle stream according to the weight of the idle stream; and when it is determined that the token is issued to the total data stream, calculate a next service period pointer corresponding to the total data stream according to the weight of the total data stream, and send the tokens to the distribution module, and wherein the distribution module is further configured to:

use a lower scheduler of the total data stream as a current layer scheduler, determine whether the current layer scheduler is hooked to the data stream;

when the result of the determination is yes, add a corresponding token into a token bucket of the data stream, and calculate a next service period pointer of the data stream according to the weight of the data stream, and terminate the present distribution of the tokens; and when the result of the determination is no, calculate the next service period pointer of the current layer token scheduler according to the weight of the current layer token scheduler.

7. The apparatus of claim 6, wherein the configuration module is further configured to configure a shaping rate of each data stream, and convert the shaping rate into the weight corresponding to respective data stream.

8. The apparatus of claim 6, further comprising: an idle stream module configured to configure a shaping rate of a current idle stream to be a maximum rate of the current idle stream, and convert the shaping rate of the current idle stream into the weight of the each date stream.

9. The apparatus of claim 6, wherein the configuration module is further configured to:

add the number of the tokens issued in each period by 1, so as to obtain the adjusted number of the tokens within each period; and use a ratio between the number of the tokens issued within each period and the adjusted number of the tokens issued within each period as the weight adjusting coefficient.

10. The apparatus of claim 6, further comprising a token generating module configured to generate a token and send the token to the bandwidth allocation module; and wherein the bandwidth allocation module is further configured to receive the token sent from the token generating module.

11. A non-transitory computer-readable storage medium storing instructions which, when executed by a processor, cause the processor to perform a method for adding tokens in traffic shaping, the method comprising:

configuring a weight of each data stream, and adding respective data stream into a corresponding token scheduler according to the weight of each data stream;

adding respective token scheduler into a corresponding token scheduler group sequentially according to a weight of each token scheduler, and aggregating all the token scheduler groups into a total data stream token scheduler;

adding the total data stream token scheduler into a top token scheduler; and assigning tokens to the total data stream token scheduler in the top token scheduler according to a preset period, and issuing the assigned tokens by the top token scheduler to respective token scheduler groups, or to respective data streams, wherein before the assigning the tokens to the total data stream token scheduler in the top token scheduler according to the preset period and issuing the assigned tokens by the top token scheduler to respective token scheduler groups, or to respective data stream, the method further comprises:

determining whether the weight of the total data stream is greater than or equal to a preset system maximum weight; and when the result of the determination is yes, increasing a number of the tokens issued within each period by a designated value to obtain an adjusted number of tokens issued within each period, calculating a weight adjusting coefficient of the total data stream according to the number of the tokens issued within each period, and multiplying the weight adjusting coefficient by an original weight of the total data, stream so as to obtain an adjusted weight of the total data stream, wherein the assigning the tokens to the total data stream token scheduler in the top token scheduler according to the preset period, and issuing the assigned tokens by the top token scheduler to respective token scheduler groups, or to respective data stream comprises:

determining whether the tokens are issued to the idle stream or to the total data stream in a current period according to a service period pointer of the top token scheduler;

when it is determined that the tokens are issued to the idle stream, calculating a next service period pointer of the idle stream according to the weight of the idle stream; and when it is determined that the tokens are issued to the total data stream, calculating a next service period pointer corresponding to the total data stream according to the weight of the total data stream, and sending the tokens to a lower scheduler of the total data stream, using the lower scheduler as the current layer scheduler, and determining whether the current layer scheduler is hooked to the data stream; when the result of the determination is yes, adding a corresponding number of tokens into a token bucket of the data stream, and calculating a next service period pointer of the data stream according to the weight of the data stream, and terminating the present distribution of the tokens; when the result of the determination is no, calculating the next service period pointer of the current layer token scheduler according to the current layer token scheduler.

* * * * *